United States Patent
Wong et al.

(10) Patent No.: US 9,947,010 B2
(45) Date of Patent: Apr. 17, 2018

(54) METHODS AND SYSTEMS FOR PAYMENTS ASSURANCE

(75) Inventors: Shoon Ping Wong, Centennial, CO (US); Sandeep Malhotra, Ballwin, MO (US); Tadepally Venkata Seshadri, Mumbai (IN); Chayan Hazra, Mumbai (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1023 days.

(21) Appl. No.: 13/547,445

(22) Filed: Jul. 12, 2012

(65) Prior Publication Data
US 2013/0018793 A1  Jan. 17, 2013

Related U.S. Application Data (60) Provisional application No. 61/508,325, filed on Jul. 15, 2011.

(51) Int. Cl.
G06Q 20/00 (2012.01)
G06Q 20/40 (2012.01)

(52) U.S. Cl.
CPC ....... G06Q 20/401 (2013.01); G06Q 20/4097 (2013.01)

(58) Field of Classification Search
None
See application file for complete search history.

(56) References Cited

U.S. PATENT DOCUMENTS

| | | | |
|---|---|---|---|
| RE40,444 E * | 7/2008 | Linehan | G06Q 20/02 705/65 |
| 2004/0243514 A1 | 12/2004 | Wankmueller | |
| 2005/0256802 A1 | 11/2005 | Ammermann et al. | |
| 2007/0027803 A1 | 2/2007 | Brandes et al. | |
| 2007/0284436 A1 | 12/2007 | Gland | |
| 2008/0154770 A1 | 6/2008 | Rutherford et al. | |

(Continued)

OTHER PUBLICATIONS

"Singapore Examination Report", dated May 5, 2017 (dated May 5, 2017), IPOS Intellectual Property Office of Singapore, for Singapore Application No. 10201605288S, 5pgs.

(Continued)

*Primary Examiner* — John W Hayes
*Assistant Examiner* — John M Winter
(74) *Attorney, Agent, or Firm* — Buckley, Maschoff & Talwalkar LLC (57) ABSTRACT

Payments assurance methods and systems are described. In some embodiments, a Proxy Service Manager Server computer receives a consumer authentication request from a merchant device, and transmits that request to an Authentication Service Manager Server computer. The Proxy Service Manager Server computer then receives a non-repudiable accountholder authentication value ("AAV") token, generates a payment authorization request that includes the AAV token, and transmits the payment authorization request to an Acquirer financial institution (FI) Server computer. The Proxy Service Manager Server computer is then operable to receive a payment authorization message, and to transmit the payment authorization message to the merchant device to enable a merchant to complete a purchase transaction with a consumer.

17 Claims, 8 Drawing Sheets

(56) References Cited

U.S. PATENT DOCUMENTS

| | | | |
|---|---|---|---|
| 2008/0319914 A1* | 12/2008 | Carrott .................. | G06Q 20/02 |
| | | | 705/75 |
| 2009/0132424 A1* | 5/2009 | Kendrick ............... | G06Q 20/20 |
| | | | 705/75 |
| 2010/0133335 A1* | 6/2010 | Maguid .................. | G06Q 20/20 |
| | | | 235/380 |
| 2010/0312703 A1 | 12/2010 | Kulpati et al. | |
| 2011/0035319 A1 | 2/2011 | Brand et al. | |

OTHER PUBLICATIONS

"Notification of Transmittal of the International Search Report and the Written Opinion of the International Searching Authority, or the Declaration", dated Sep. 21, 2012, for International Application No. PCT/US12/46443, 9pgs.

"Singapore Search Report and Written Opinion", dated Oct. 12, 2016 (dated Oct. 12, 2016), IPOS Intellectual Property Office of Singapore, for Singapore Application No. 10201605288S, 7pgs.

* cited by examiner

METHODS AND SYSTEMS FOR PAYMENTS ASSURANCE

CROSS REFERENCE TO RELATED APPLICATION

This application claims the benefit of and priority to U.S. Provisional Patent Application Ser. No. 61/508,325, filed Jul. 15, 2011, which is incorporated herein by reference for all purposes

BACKGROUND OF THE INVENTION

Mobile telephones and other mobile communications devices (such as personal digital assistants) are carried by millions of consumers, and there have been a number of attempts to integrate payment applications with these mobile devices. However, some of these attempts to provide methods and systems to facilitate "card not present" payment capabilities require substantial changes to existing payment authorization systems, making it difficult to achieve widespread adoption of mobile payments. In addition, difficulties arose due to various country mandates and/or regulatory requirements, such as those required by India that require cardholder authentication or validation to be performed by the cardholder (consumer) and verified by the Issuer financial institution (the entity that issued the payment account to the consumer). Accordingly, there is a need for authentication methods and systems for facilitating payment schemes where cardholder authentication and Issuer financial institution verification are desired and/or mandated.

DETAILED DESCRIPTION

In general, and for the purpose of introducing concepts of the embodiments described herein, systems, methods and apparatus are described for providing an Authentication Service Manager to authenticate and/or validate a consumer (cardholder) who is utilizing a mobile device (or merchant device) to pay for goods and/or services. In particular, in some embodiments, a consumer with a mobile device (such as a cell phone, personal digital assistant (PDA), laptop computer, touchpad computer, and the like) having a payment application enrolls his or her payment account with an Authentication Service Manager that has a relationship with an Issuer financial institution (Issuer FI; which issued the payment account to the cardholder). In addition, a merchant having a merchant device (such as a point-of-sale (POS) terminal, automatic teller machine (ATM), personal computer, computer server (hosting a website, for example), an interactive voice response (IVR) system, a land-line telephone, or any type of mobile device such as a mobile telephone, personal digital assistant (PDA), laptop computer, touchpad computer, and the like) enrolls his or her merchant financial account with a Proxy Service Manager that has a relationship with an Acquirer financial institution (Acquirer FI; which holds the merchant's financial account). During a purchase transaction (for example, when the consumer uses her or his mobile device to pay for merchandise at a merchant's retail store), the consumer provides payment information to the merchant who utilizes a merchant device to initiate the purchase transaction request by transmitting the cardholder payment information to the Proxy Service Manager. It should be understood that many types of transactions qualify for the service described herein including, but not limited to, telephone orders, mail orders, e-commerce (Internet) orders, POS-initiated transactions, standing instructions for a transaction, and/or other types of transactions including non-financial transactions.

In some embodiments, the Proxy Service Manager forwards the payment information to the Authentication Service Manager, which validates the consumer information including cardholder authentication credentials and sends a challenge/response request to the consumer's mobile device. The consumer, through the mobile device, authenticates to the challenge and transmits a response to the Authentication Service Manager which then validates the cardholder authentication credentials and generates a dynamic and unique Accountholder Authentication Value ("AAV"). The AAV is then returned to the Proxy Service Manager, which transmits the financial transaction information including the AAV to the Acquirer Financial Institution, which submits the transaction information to a payment network. The payment network submits the financial transaction information to the Issuer FI (which issued the payment account to the consumer/cardholder, who also is the mobile device owner). The Issuer FI validates the AAV and continues to process the authentication request by, for example, checking to make sure that the accountholder has adequate funds in his or her financial account (which may be a credit card account or a debit card account, for example) to pay for the merchandise or services of the merchant. If everything is in order, the Issuer FI approves the transaction and funds are transferred to the merchant's account, which is held by the Acquirer FI. The Acquirer FI then notifies the Proxy Service Manager that the transaction has been approved, which in turn contacts the merchant with the approval information. The transaction is then consummated as the merchant provides the merchandise and/or the service to the consumer. Such a process may occur in real-time, for example, while the consumer/cardholder is in a checkout line at a merchant retail location. Furthermore, such a method provides chargeback protection for the merchant because of the additional security provided by requiring both cardholder authentication and issuer validation.

The term "consumer device" as used herein may refer to a handheld or portable or mobile device carried or used by a cardholder or consumer, or may refer to other types of electronic devices such as a personal computer, a land-line telephone, an IVR system, and the like. In the context of some embodiments, a "mobile device" is a device, such as a laptop computer, a personal digital assistant (PDA), a mobile telephone, a portable music player (such as an iPod™ and the like), that has a payment application stored, loaded or otherwise installed in or on the mobile device such that the cardholder (or consumer) may conduct payment transactions involving a financial account such as a payment card account (which may refer to a credit card account, a debit card account, and/or a pre-paid card account, for example).

In general, an Acquirer FI is the organization that transmits a purchase transaction to a payment system for routing to the Issuer of the payment account in question. Typically, the Acquirer FI has an agreement with merchants, wherein the Acquirer FI receives authorization requests for purchase transactions from the merchants, and routes the authorization requests to the Issuers via payment networks. The terms "Acquirer", "Acquirer FI", "Acquiring FI", and "merchant's bank" may be used interchangeably herein. The terms "Issuer", "Issuer FI" and "Issuing FI" may also be used interchangeably herein to refer to the financial institution that issued a payment account (which may be a cardholder account associated with, for example, a credit card, a debit card and/or a pre-paid card).

In addition, the term "payment network" is used to refer to one or more networks that are used to process a payment transaction, which may include one or more server computers. For example, a payment network may be the BankNet® processing network operated by MasterCard International Incorporated. Those skilled in the art will appreciate that other networks may also be used to facilitate the authorization, clearing and settlement of payment transactions as described herein.

The term "primary account number" (or "PAN") is used herein to refer to a number of digits (or characters) which identify a payment account issued by an issuer. For example, in some embodiments a payment account is a credit account which is issued by a financial institution pursuant to the MasterCard International Incorporated rules, and the PAN may be a twelve to nineteen-digit string that identifies both the issuer (which may be based on the first few digits of the string, for example, the first five to ten digits) and the payment account number at the issuer. The PAN is typically utilized to route and process transactions that involve the payment card and the payment card account. Those skilled in the art will appreciate that other primary account number schemes and formats may be used in conjunction with embodiments described herein.

In some embodiments, the Authentication Service Manager activates the authentication service for a cardholder (consumer) and a Proxy Service Manager activates the authentication service for a merchant.

Figure 1A:
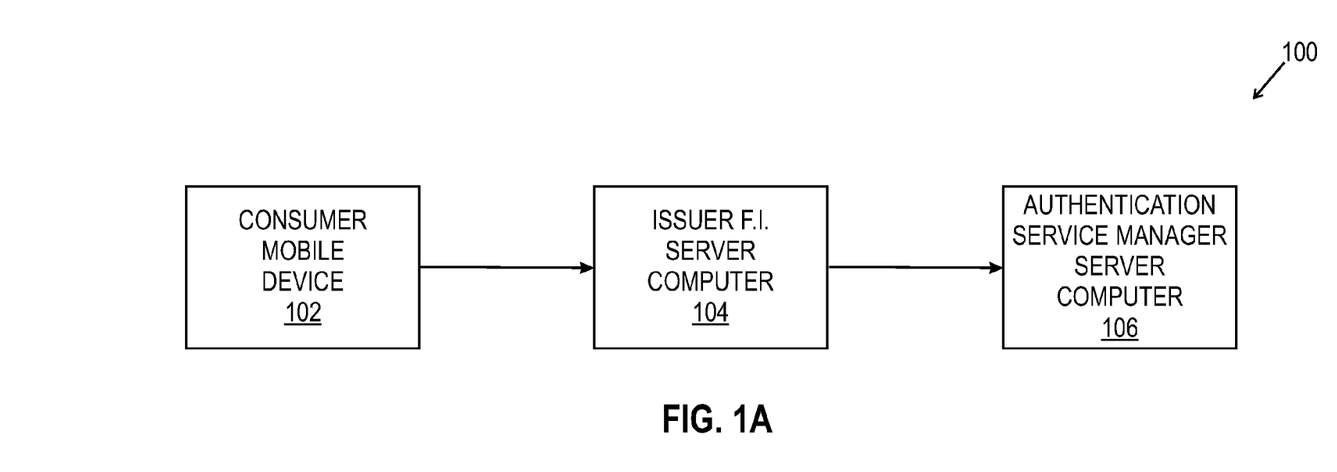
FIG. 1A is a block diagram illustrating components that may be utilized to perform an activation process for a consumer/cardholder having a mobile device for an authentication service according to an embodiment of the invention.

FIG. 1A is a block diagram 100 illustrating the components that may be utilized to perform a process for activating the authentication service for a consumer (cardholder) having a mobile device 102 according to an embodiment. In particular, an Issuer FI establishes a relationship with an Authentication Manager which may entail using an Issuer FI server computer 104 to communicate with an Authentication Service Manager Computer 106 to transmit cardholder identification information so that an enrollment and activation process can be initiated with the Authentication Service Manager for cardholders. The Authentication Service Manager receives the information and then activates the authentication service for each individual cardholder by creating a link between a particular cardholder's mobile device and that cardholder's financial account payment credentials (which information was provided by the Issuer FI). In some embodiments, the consumer (cardholder) may provide an alias or surrogate factor as an identifier that can be mapped to, for example, the primary account number (PAN) of the cardholder's account. For example, the consumer may provide a mobile telephone number, a national identification number (NID), a user identifier (UID), a frequent flier identifier, a driver's license identifier and/or some other consumer identifier that may be linked to the cardholder's mobile device and that can be used to map to a financial account of the consumer. Such identifiers may include numbers and/or alphabetical characters. During the registration process, in addition to one or more identifiers and the PAN, the consumer may also provide data such as an expiration date for a particular financial account (such as a credit card, or a debit card, or a pre-paid card, or other type of financial account).

In some embodiments, the Authentication Service Manager 106 may notify the cardholder that registration and/or activation was successfully achieved by transmitting an SMS message (or a text message, or some other type of message) to the consumer mobile device 102. For example, the mobile device may receive and then display a message that states: "Congratulations! Your payment account number XCX-3682 has been activated for mobile purchase transactions!" The message may include details (such as a consumer identifier and/or the telephone number of the consumer's mobile telephone) concerning the link to the cardholder's financial account and/or provide a link to a website that allows the cardholder to manage the account or to obtain further information.

Figure 1B:
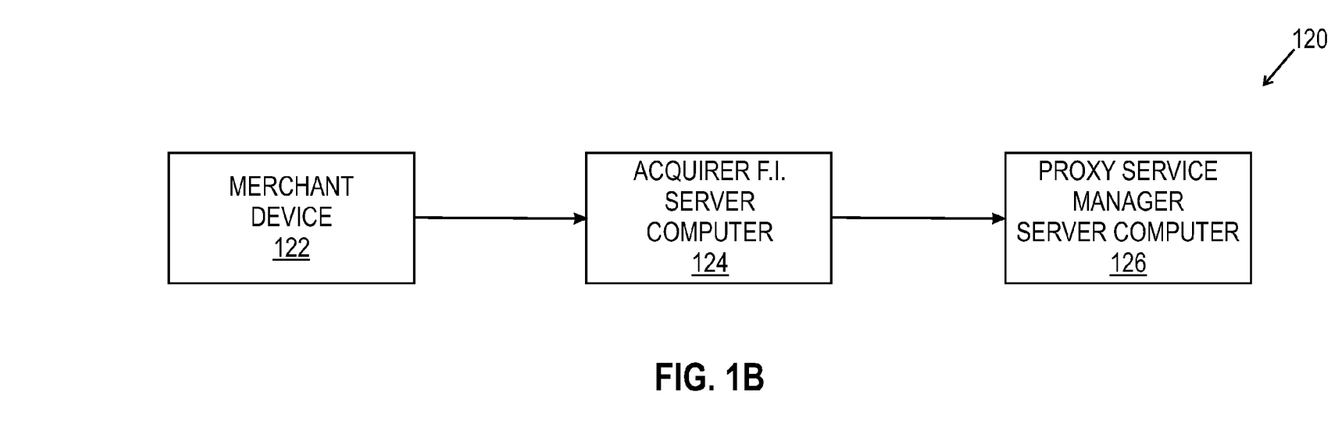
FIG. 1B is a block diagram illustrating components that may be used to perform an activation process for a merchant having a merchant device for an authentication service according to an embodiment of the invention.

FIG. 1B is a block diagram 120 illustrating components according to an embodiment that may be used to perform a process for activating the authentication service for a merchant having a merchant device 122 (which may be, for example, a point-of-sale (POS) terminal, or a laptop computer, or a mobile device (such as a cell phone)). An Acquirer FI establishes a relationship with a Proxy Service Manager, which in some embodiments involves using an Acquirer FI server computer 124 to communicate with a Proxy Service Manager Server computer 126. The Proxy Service Manager computer receives information concerning financial accounts held by the Acquirer FI for one or more merchants, and then activates the authentication service for those merchants. Each merchant may be notified by the Proxy Service Manager Server computer that activation of the authentication assurance service was successful for that merchant's financial account held by the Acquirer FI.

In some embodiments, the authentication service manager computer 106 and the proxy service manager computer 126 may be controlled and/or maintained by a single, third-party entity. Thus, the same entity (and same server computer)

may be responsible for performing the separate consumer registration and merchant registration functions as explained above. In addition, in some embodiments the functionality of the authentication service manager computer 106 and of the proxy service manager computer 126 may be handled by one server computer operated by a single third-party entity.

Figure 2:
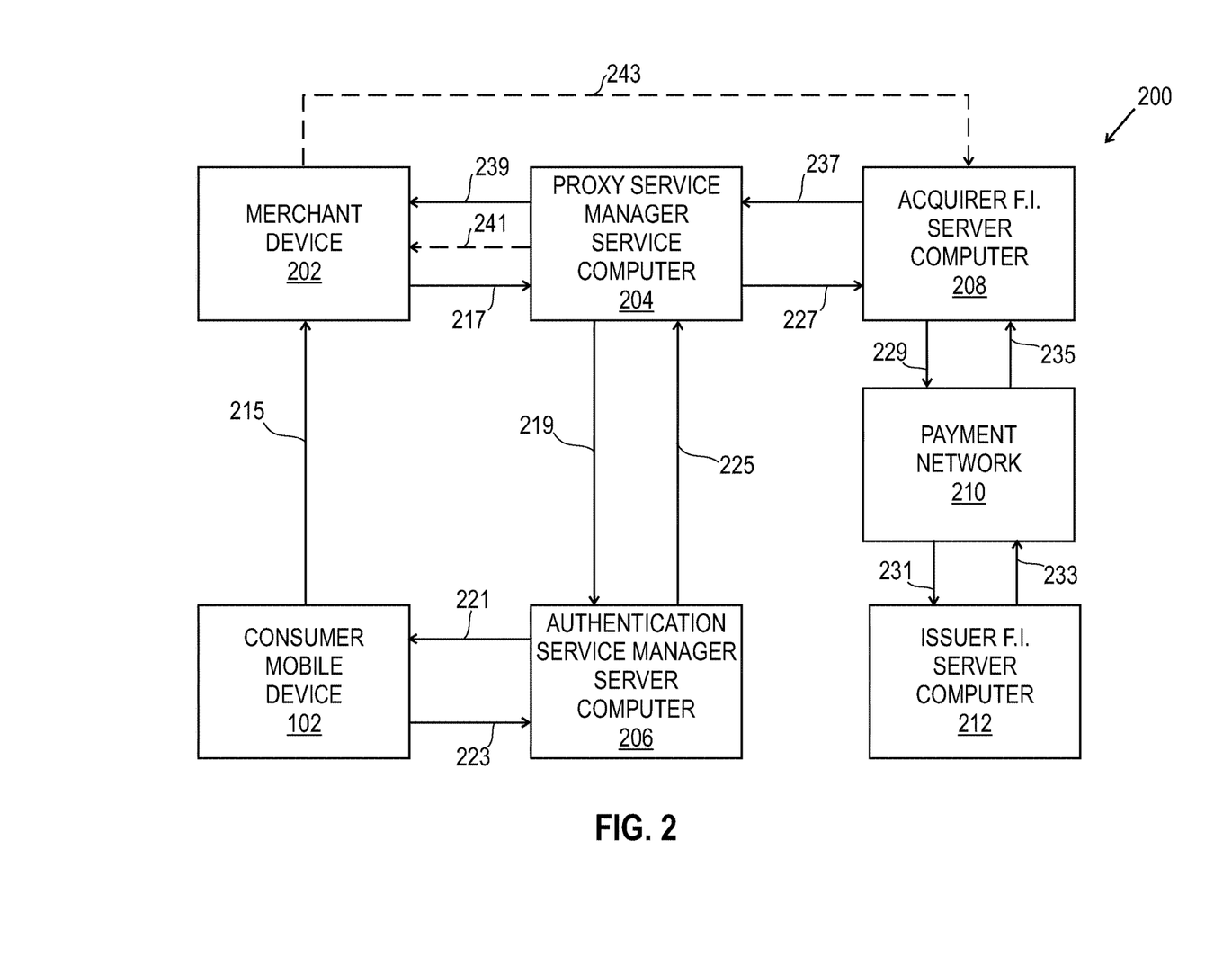
FIG. 2 illustrates an embodiment of an assurance service system for supporting merchant initiated remote payments according to an embodiment of the invention.

FIG. 2 illustrates an embodiment of an assurance service system 200 for supporting merchant-initiated remote payments. The system 200 includes a merchant device 202 adapted for communications with a Proxy Service Manager server computer 204, an Authentication Service Manager server computer 206, an Acquirer FI server computer 208, a payment network 210, and an Issuer FI server computer 212. Also shown is a consumer mobile device 102, which is utilized by a cardholder as explained below to initiate a payment transaction with the merchant device 202.

For ease of understanding only one Proxy Service Manager Server computer and one Authentication Service Manager Server computer are illustrated in the assurance service system 200 depicted in FIG. 2. But it should be understood that in some embodiments a plurality of Proxy Service Manager Server computers and a plurality of Authentication Service Manager Server computers may be utilized.

As explained above with regard to FIGS. 1A and 1B, merchants and consumers register in order to utilize the present payments assurance service system. In some embodiments, a parameter file may be transmitted to each Proxy Service Manager Server computer at predetermined intervals (such as daily) that includes an updated list of Authentication Service Managers and associated consumers (or cardholders). In some embodiments, each Proxy Service Manager Server computer may transmit authentication requests to a "master" Authentication Service Manager Server computer (not shown) which is operable to route the authentication request to a particular designated Authentication Service Manager Server computer.

Referring again to FIG. 2, in some embodiments a challenge and response process is utilized by the assurance service system 200 to authenticate the cardholder during a payment transaction. For example, the consumer may utilize her mobile device 102 to provide 215 an identifier (which may be an alias identifier, for example) and/or payment information to the merchant device 202. In such implementations, the consumer's mobile device may be a mobile telephone (or cell phone) that includes an integrated circuit (IC) and a stored payment application (which may be a mobile wallet application running on the consumer's mobile telephone that includes data concerning one or more of the consumer's financial accounts). Such a mobile telephone may be configured for transmitting required payment transaction data to a proximity device associated with a POS terminal. For example, the consumer may tap her cell phone on a proximity payment device (a receiver) associated with a POS terminal to initiate a purchase transaction. Consumer information which may include an identifier or surrogate factor and/or payment information that may include identity information and/or payment card account data is then transferred from the cell phone to the POS terminal for processing. Once this occurs, in some embodiments the merchant device 202 initiates 217 an authentication request and transmits the consumer information to the Proxy Service Manager Server computer 204.

In some embodiments, the Proxy Service Manager Server computer 204 establishes a secure channel with the Authentication Service Manager Server computer 206 and then transmits 219 the consumer information thereto. In embodiments wherein the consumer information consists of a surrogate factor or an alias (for example, a frequent flyer account number or a user identifier), the Authentication Service Manager computer 206 performs a mapping function of the surrogate factor or alias to a particular consumer account to thus determine the cardholder payment account information. The Authentication Service Manager then validates the cardholder's payment information and looks up the MSISDN (the "Mobile Subscriber Integrated Services Digital Network" number, which is the same number as the mobile telephone number of a SIM card of the consumer's cell phone) that is registered to the cardholder.

Next, the Authentication Service Manager Server computer 206 transmits 221 a challenge/response request (for example, an IVR call-back message) to the cardholder's mobile device 102. The cardholder then authenticates 223 to the challenge/response request with the Authentication Service Manager Server computer 206. The Authentication Service Manager Server computer then validates the credentials (for example, a password, a numeric PIN or a real-time token with a purchase identifier (previously generated by the Authentication Service Manager Server computer and transmitted to the cardholder's mobile device via any of a variety of communication channels, for example, SMS, e-mail, and the like) provided by the cardholder and generates a dynamic and unique (and non-repudiable) accountholder authentication value ("AAV") token. A non-repudiable AAV token is defined as a transaction-specific security token for transaction matching at the Issuer's server that cannot be disputed after the transaction-specific security token is verified by the Issuer.

With reference again to FIG. 2, the Authentication Service Manager Server computer 206 next provides 225 the AAV token to the Proxy Service Manager Server computer 204, which creates a payment authorization request (for example, an ISO-8583 authorization request message) with the AAV token in, for example, a Universal Card Authentication Field ("UCAF"). (The term "ISO-8583" refers to a standard that provides a set of rules for the definition of financial transaction protocols. The UCAF is intended to be security-scheme independent and offers standardized fields and messages for use by merchants and MasterCard™ members to collect and transport authentication information. Once collected by the merchant and the Acquirer FI, this information is communicated to the Issuer in the payment authorization request and it provides explicit evidence that the transaction was originated by the account holder.)

The authorization request is then transmitted 227 to the Acquirer FI server computer 208. The Acquirer FI server computer 208 then sends 229 the authorization request to the payment network 210 which routes 231 the authorization request to the Issuer FI server computer 212. The Issuer FI server computer validates the AAV supplied in the UCAF, and if all is in order, transmits 233 a payment authorization response message to the payment network 210, which routes it 235 to the Acquirer FI server computer 208. The Acquirer FI server computer 208 then transmits 237 the payment authorization message to the Proxy Service Manager server computer which sends 239 the payment authorization message to the Merchant Device 202 so that the merchant can complete the purchase transaction with the consumer.

The process described immediately above is an example of a method wherein a one-time token (the AAV token) is generated during the lifecycle of a transaction and validated during that transaction, which occurs in some embodiments. In some other implementations, however, the AAV token may be generated before the payment transaction is initiated and then it is validated during the payment transaction.

Referring again to FIG. 2, in some embodiments the processing differs in that after the cardholder is authenticated, the Proxy Service Manager 204 returns (see dotted line 241) the AAV generated by the Authentication Service Manager 206 directly to the Merchant Device 202. In this case, the Merchant Device 202 is operable to create a payment authorization request message with the AAV token in the UCAF, and to transmit that payment authorization request directly (see dotted line 243) to the Acquirer FI Server computer 208 for further processing as described above. In particular, the Acquirer FI Server computer 208 then routes 229 the payment authorization request through the payment network 210 which transmits 231 the request to the Issuer FI Server computer 212, which validates the AAV and generates a payment authorization response message. The payment authorization message is then routed 233, 235 back to the Acquirer FI Server computer 208 and then next routed 237 to the Proxy Service Manager Server computer 204, and lastly routed 239 to the Merchant Device 202, so that the merchant can complete the purchase transaction with the consumer.

It should be understood that other processing techniques can be utilized in accordance with the embodiments described herein that may depend upon the capabilities of the authorization system 200. For example, the merchant device 202 may be operable to interact directly with the authentication service manager server computer 206 (pathway not shown in FIG. 2), or may be operable to first interact with the acquirer FI computer 208 or with the Issuer FI computer 212, or with a payment gateway (not shown) or with a payment processor (not shown) during a payment transaction. In some other embodiments, the Proxy Service Manager computer 204, for example, may be operable to first interact with the Issuer FI server computer 212, or with a payment gateway (not shown) or with a payment processor (not shown) during a payment transaction.

Figure 3:
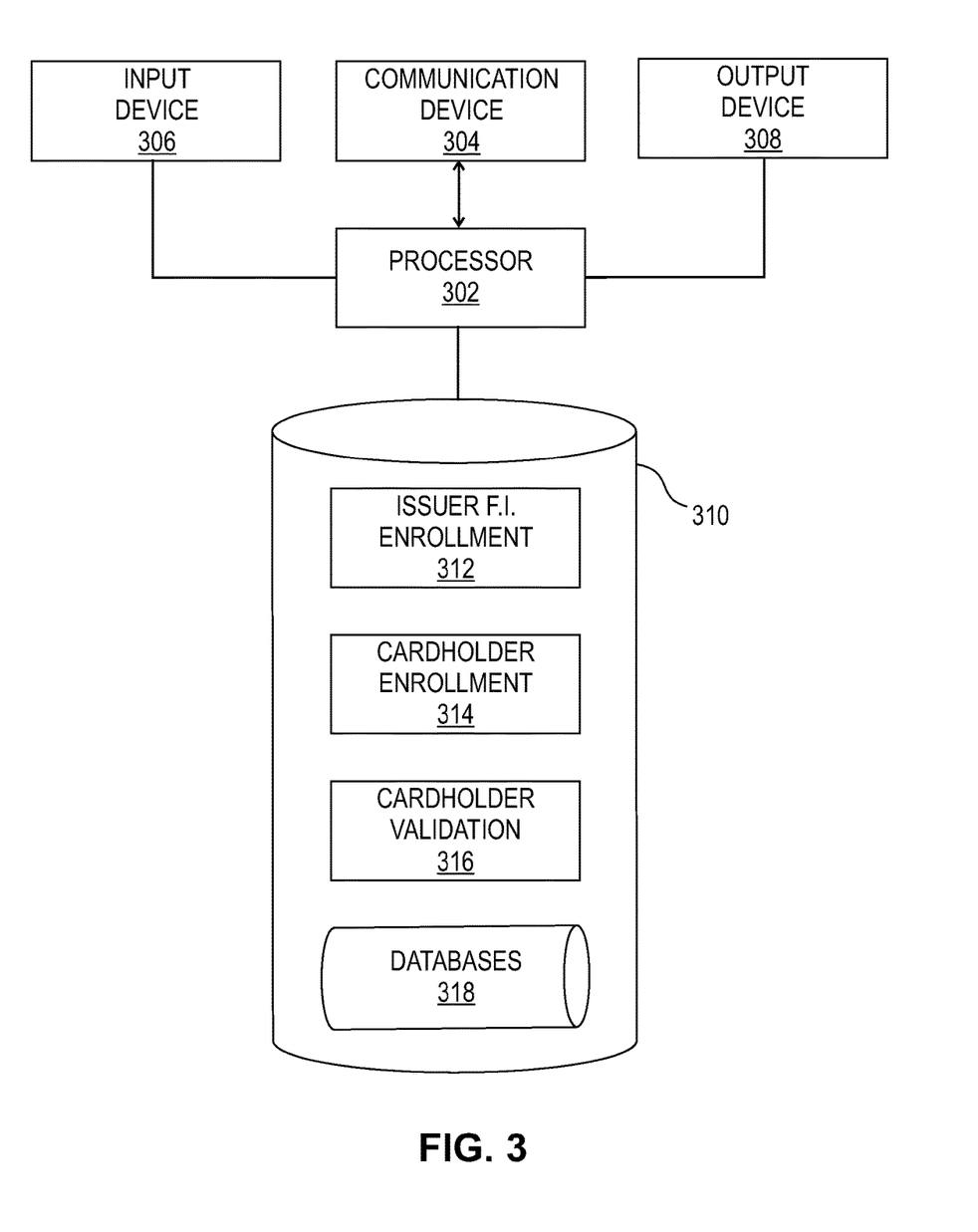
FIG. 3 is a block diagram of an embodiment of an Authentication Service Manager Server computer in accordance with an embodiment of the invention.

FIG. 3 is a block diagram of an embodiment of an Authentication Service Manager Server computer 300. The Authentication Service Manager Server computer may be conventional in its hardware aspects but may be controlled by software to cause it to operate in accordance with aspects of the methods presented herein. In particular, the Authentication Service Manager Server computer 300 may include a computer processor 302 operatively coupled to a communication device 304, an input device 306, an output device 308, and a storage device 310.

The computer processor 302 may constitute one or more conventional processors. Processor 302 operates to execute processor-executable steps, contained in program instructions described herein, so as to control the Authentication Service Manager Server computer 300 to provide desired functionality.

Communication device 304 may be used to facilitate communication with, for example, other devices (such as a consumer mobile device 102 and/or a Proxy Service Manager Server computer 204 shown in FIG. 2). Communication device 304 may, for example, have capabilities for engaging in data communication over proprietary networks and/or over conventional computer-to-computer data networks. Such data communication may be in digital form and/or in analog form.

Input device 306 may comprise one or more of any type of peripheral device typically used to input data into a computer. For example, the input device 306 may include a keyboard and a mouse and/or a touchpad and/or a touch screen. Output device 308 may comprise, for example, a display and/or a printer.

Storage device 310 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as "flash" memory devices. Any one or more of the listed storage devices may be referred to as a "memory", "storage", "storage medium" or "computer readable medium".

Storage device 310 stores one or more programs or applications for controlling the processor 302. The programs comprise program instructions that contain processor-executable process steps for the Authentication Service Manager Server computer 300, including, in some cases, process steps that constitute processes provided in accordance with principles of the processes presented herein.

The programs may include an application 312 that manages processes by which the Authentication Service Manager Server computer establishes relationships with Issuer financial institutions by enrolling the Issuer FIs, and an application 314 that enrolls and activates the authentication and validation service for consumers (cardholders) that have payment accounts (or other types of financial accounts) associated with and issued by the enrolled Issuer FIs. For example, the cardholder enrollment application 314 may operate to activate an authentication service for a cardholder by creating a link between the cardholder's mobile device and the payment credentials of the cardholder's payment account (which credentials may include, for example, a PAN, account expiration date and/or a password). In addition, a cardholder validation application 316 may be included, which may, for example, cause the processor 302 to validate cardholder information based on payment account information, look up the registered MSISDN of the cardholder's mobile telephone, generate a dynamic and unique accountholder authentication value (AAV), and transmit the AAV, for example, to a Proxy Service Manager Server computer upon successful cardholder authentication.

Reference numeral 318 in FIG. 3 identifies one or more databases that are maintained by the Authentication Service Manager Server computer 300 on the storage device 310. Among these databases may be, for example, cardholder mobile device data, cardholder payment account data, Proxy Service Manager identification data, security logs, an Issuer database, and a transaction database.

It should be understood that other application programs may also be stored on the storage device 310 that are operable to cause a processor to function in accordance with embodiments disclosed herein. For example, a mapping application may be stored in the storage device 310 that causes the processor 302 to map a consumer alias or surrogate factor to a financial account of a consumer during a payment transaction.

Figure 4:
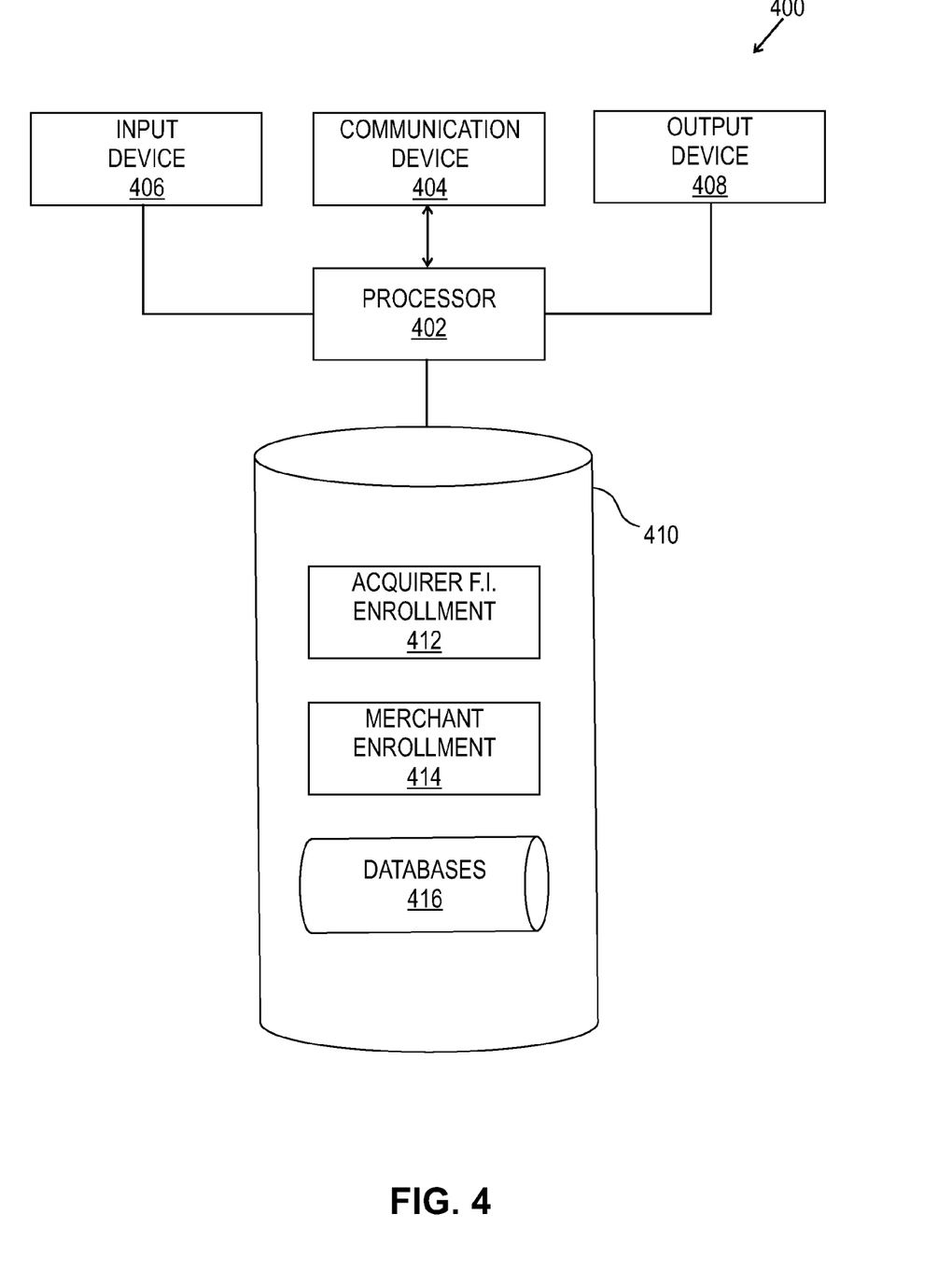
FIG. 4 is a block diagram of an embodiment of a Proxy Service Manager Server computer in accordance with an embodiment of the invention.

FIG. 4 is a block diagram of an embodiment of a Proxy Service Manager Server computer 400. The Proxy Service Manager Server computer may be conventional in its hardware aspects but may be controlled by software to cause it to operate in accordance with aspects of the methods presented herein. In particular, the Proxy Service Manager Server computer 400 may include a computer processor 402 operatively coupled to a communication device 404, an input device 406, an output device 408, and a storage device 410.

The computer processor 402 may constitute one or more conventional processors. Processor 402 operates to execute processor-executable steps, contained in program instructions described herein, so as to control the Proxy Service Manager Server computer 400 to provide desired functionality.

Communication device 404 may be used to facilitate communication with, for example, other devices (such as a merchant device 202 and/or an Authentication Service Manager Server computer 206 shown in FIG. 2). Communication device 404 may, for example, have capabilities for engaging in data communication over proprietary networks and/or over conventional computer-to-computer data networks. The data communication may be in digital form and/or in analog form.

Input device 406 may comprise one or more of any type of peripheral device typically used to input data into a computer. For example, the input device 406 may include a keyboard and a mouse and/or a touchpad and/or a touch screen. Output device 408 may comprise, for example, a display and/or a printer.

Storage device 410 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as "flash" memory devices. Any one or more of the listed storage devices may be referred to as a "memory", "storage", "storage medium" or "computer readable medium".

Storage device 410 stores one or more programs or applications for controlling the processor 402. The programs comprise program instructions that contain processor-executable process steps for the Proxy Service Manager Server computer 400, including, in some cases, process steps that constitute processes provided in accordance with principles of the processes presented herein.

The programs may include an application 412 that manages a process by which the Proxy Service Manager Server computer establishes relationships with Acquirer financial institutions by enrolling a particular Acquirer FI, and an application 414 that enrolls and activates merchants that have financial accounts associated with and issued by the enrolled Acquirer FI's. For example, the merchant enrollment application 414 may operate to activate the authentication service for a merchant by linking a merchant's device (such as a POS terminal or a merchant's cell phone) and the merchant's account(s) credentials (which credentials may include, for example, an account number and/or a password).

It should be understood that other application programs may also be stored on the storage device 410 operable to cause a processor to function in accordance with embodiments disclosed herein. For example, in some embodiments an application may be stored therein that causes the processor 402 to build an ISO-8583 purchase transaction and submit it for authorization to an acquiring FI or payment gateway or payment processor, or for submit it directly to a payment network.

Reference numeral 416 in FIG. 4 identifies one or more databases that are maintained by the Proxy Service Manager Server computer 400 on the storage device 410. Among these databases may be, for example, merchant device data, merchant account data, Proxy Service Manager identification data, security logs, an Acquirer database, and a transaction database.

Figure 5:
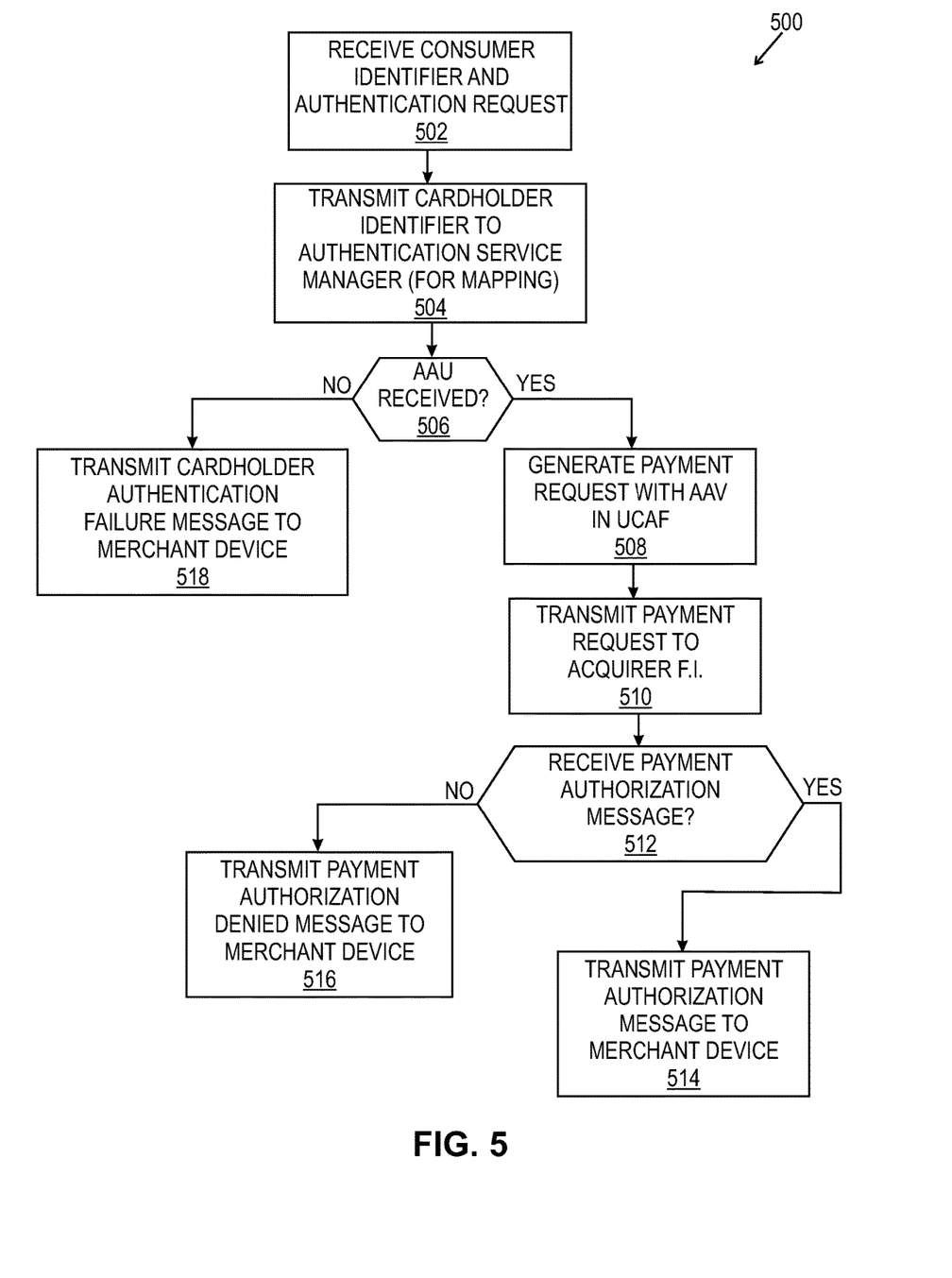
FIG. 5 is a flowchart illustrating a consumer authentication and payment authorization process from the point of view of the Proxy Service Manager Server computer of FIG. 2 according to an embodiment of the invention.

FIG. 5 is a flowchart illustrating a consumer authentication and payment authorization process 500 according to an embodiment from the point of view of the Proxy Service Manager Server computer 204 of FIG. 2. In particular, the Proxy Service Manager Server computer receives 502 a consumer identifier and an authentication request from a merchant device. In some embodiments, the Proxy Service Manager Server computer establishes a secure channel with an Authentication Service Manager Server computer and then transmits 504 the consumer identifier to the Authentication Service Manager Server computer. In some embodiments, the consumer identifier is an alias entered by the consumer or provided to the merchant, and it contains two pieces of information. In particular, such an alias/identifier includes information to identify the consumer and to identify a specific cardholder account to be utilized for the payment transaction. Thus, if the consumer identifier is an alias (or surrogate factor), then the Authentication Service Manager computer maps the consumer identifier to the consumer's cardholder account or other financial information and continues to process the information. (Of course, if the consumer identifier is a cardholder account identifier, then a mapping process is not necessary.) Next, if the consumer (cardholder) is authenticated, the Proxy Service Manager Server computer will receive a non-repudiable accountholder authentication value ("AAV") token. Thus, if an AAV token is received 506, in some embodiments the Proxy Service Manager Server computer generates 508 a payment authorization request (for example, an ISO-8583 authorization request message) with the AAV token in, for example, a Universal Card Authentication Field ("UCAF"). The Proxy Service Manager Server computer next transmits 510 the payment request to the Acquirer FI Server computer.

Referring again to FIG. 5, if all was in order (i.e., the cardholder account was verified by the Issuer financial institution and contains sufficient funds or a sufficient credit line to cover the cost of the purchase transaction) then the Proxy Service Manager Server computer receives 512 a payment authorization response message. The payment authorization response message is then transmitted 514 to the Merchant Device so that the merchant can complete the purchase transaction with the consumer. However, if instead of receiving a payment authorization response in step 512, the Proxy Service Manager receives, for example, a payment declined message then the Proxy Service Manager transmits 516 a payment authorization denied message to the merchant. In this case, the merchant does not complete the purchase transaction with the consumer.

Referring again to step 506 in FIG. 5, if an AAV token is not received from the Authentication Service Manager Server computer within a predefined time (for example), or if an "authentication failed" message is received from the Authentication Service Manager Server computer, then the Proxy Service Manager Server computer transmits 518 a "cardholder authentication failure" message to the Merchant Device. Thus, in this case, either a problem occurred with regard to the consumer identifier and/or the authentication service manager could not map the alias or surrogate factor to a cardholder account. Thus, in such a case the merchant does not complete the purchase transaction with the consumer because the consumer's payment credentials were not authenticated.

Figure 6:
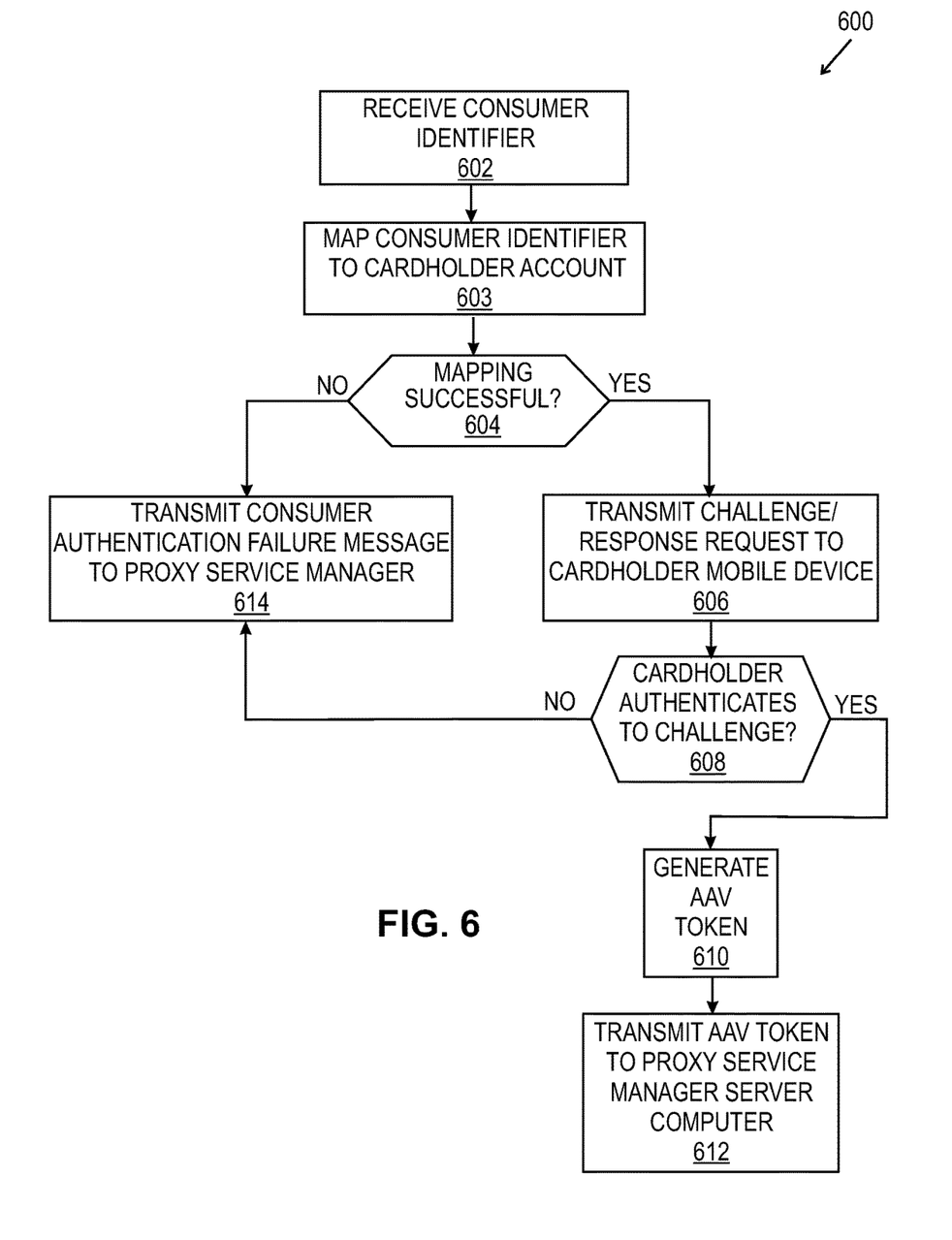
FIG. 6 is a flowchart illustrating a consumer authentication process from the point of view of the Authentication Service Manager Server computer of FIG. 2 according to an embodiment of the invention.

FIG. 6 is a flowchart illustrating a consumer authentication process 600 from the point of view of the Authentication Service Manager Server computer 206 of FIG. 2 according to an embodiment. The Authentication Service Manager Server computer receives 602 the consumer identifier from the Proxy Service Manager Server computer. In some embodiments, the consumer identifier is a surrogate factor, for example, a frequent flyer account number or a user identifier. In some embodiments, the consumer provided the frequent flyer account number or identification number to the Authentication Service Manager during the registration process. Next the Authentication Service Manager Server computer attempts to map 60 the surrogate factor to the consumer's cardholder account. If the mapping was successful (for example, the Authentication Service Manager computer found a match in a database of registered consumer accounts), then the Authentication Service Manager Server computer transmits 606 a challenge/response request (for example, an IVR call-back message) to the cardholder's mobile telephone or other mobile device. If the cardholder authenticates to the challenge/response request 608, for example by providing a correct password or numeric PIN or a real-time token with a purchase identifier (previously generated by the Authentication Service Manager Server computer and transmitted to the cardholder's device via any of a variety of communication channels, such as via SMS, or e-mail, and the like), then the Authentication Service Manager Server computer validates the credentials provided by cardholder or consumer and generates 610 a dynamic and unique (and non-repudiable) accountholder authentication value ("AAV") token. Next, the Authentication Service Manager Server computer transmits 612 the AAV token to the Proxy Service Manager Server computer for further processing. At this point, the Authentication Service Manager Server computer awaits further authentication requests.

However, referring again to FIG. 6, if mapping was unsuccessful in step 604 because, for example the MS-ISDN (the mobile telephone number of a SIM card of the consumer's cell phone) is not registered with the Authentication Service Manager (or the payment account is otherwise not registered with the Authentication Service Manager), then the Authentication Service Manager Server computer transmits 614 a cardholder authentication failure message to the Proxy Service Manager Server computer and the process ends. In this case, the purchase transaction will not be consummated because the Proxy Service Manager Server computer will in turn transmit the cardholder authentication failure message to the Merchant Device to alert the merchant that the cardholder has not been authenticated.

Referring again to FIG. 6, if in step 608 the cardholder fails to authenticate to the challenge/response request, then the Authentication Service Manager Server computer again transmits 614 a cardholder authentication failure message to the Proxy Service Manager Server computer and the process ends. As before, the purchase transaction will not be consummated in this case because the Proxy Service Manager Server computer will in turn transmit the cardholder authentication failure message to the Merchant Device to alert the merchant that the cardholder has not been authenticated.

Figure 7:
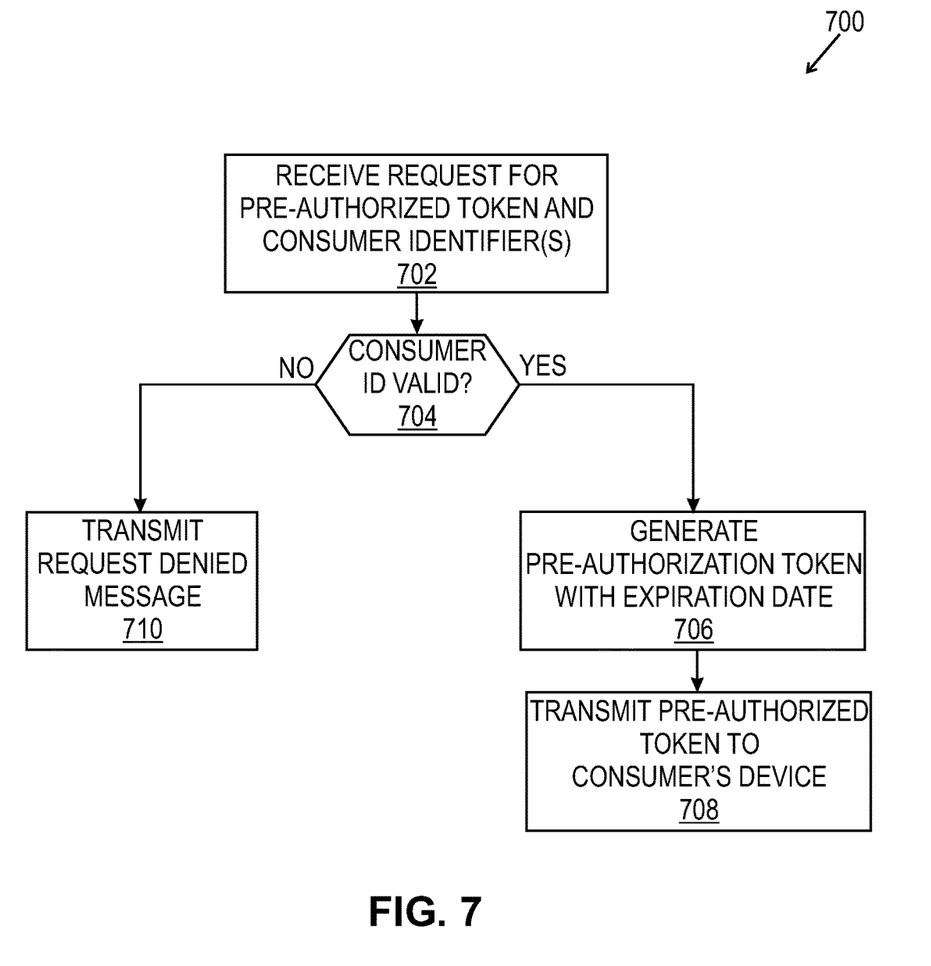
FIG. 7 illustrates a process for issuing a pre-authorized token according to an embodiment of the invention.

In some embodiments, Issuer financial institutions may desire to implement a process that includes providing a pre-authorized token to registered cardholders for use in making purchase transactions. Use of such a pre-authorized token may enhance the consumers' purchase transaction experiences because it facilitates authentication of the consumer when the consumer wishes to consummate a purchase transaction with a merchant. For example, FIG. 7 illustrates a process 700 for issuing a pre-authorized token according to an embodiment. An authentication service manager computer receives 702 a request for a pre-authorized token from a consumer who is already registered with an Issuer FI and registered with an associated Authentication Service Manager. In some embodiments, the consumer utilizes his or her mobile device (for example, cell phone or laptop or touchpad computer) or uses a personal computer with a web browser, to transmit his or her authentication credentials to the Authentication Service Manager Server computer along with a request for a pre-authorized token. If the consumer's authentication credentials (such as a mobile telephone number, driver's license ID, frequent flyer ID and the like) are successfully validated 704, then the Authentication Service Manager Server computer generates 706 a pre-authorized token that includes an expiration date or period. In some implementations, the expiration date is no more than twenty-four (24) hours from the time of issuance of the pre-authorized token, whereas in other embodiments the pre-authorized token may be valid for shorter or longer periods of time. The Authentication Service Manager Server computer then transmits 708 the generated pre-authorized token (with an expiration date) to, for example, the consumer's mobile device for use in making purchase transactions. However, if in step 704 the consumers' identifier could not be validated, then the Authentication Service Manager computer transmits 710 a "Request Denied" message to the consumer's mobile device.

It should be noted that such a pre-authorized token will, in some embodiments, always be associated to a specific cardholder payment account during the time of generation. For example, if a consumer has two or more payment accounts registered with the Authentication Service Manager, and a pre-authorized token is generated for "Account A", then the pre-authorized token will only be valid for Account A and not for any of the other accounts that consumer has with the Authentication Service Manager. If the consumer uses the pre-authorized token and specifies a payment account other than "Account A" for making a purchase transaction authorization request, then the Authentication Service Manager Server computer will reject the transaction request. In some embodiments, the pre-authorized token may be associated with a specific merchant (for example, BestBuy™, Amazon.com™ and the like), and/or with a merchant category (for example, airlines, hotels and the like). In this implementation, if the consumer attempts to use a pre-authorized token that is not configured for use with either a particular merchant or merchant category, the Authentication Service Manager Server computer will reject the transaction request. In addition, in some embodiments the pre-authorized token may be assigned a maximum purchase amount (for example, $100 US Dollars). In such an embodiment, for example, if the consumer attempts to use that pre-authorized token for purchases that exceed $100 US Dollars, then the Authentication Service Manager Server computer will reject the transaction request. Such limitations on the use and/or dollar amount that may be spent and/or other restrictions may be applied together or in any combination to any pre-authorized token or class of pre-authorized tokens.

Figure 8:
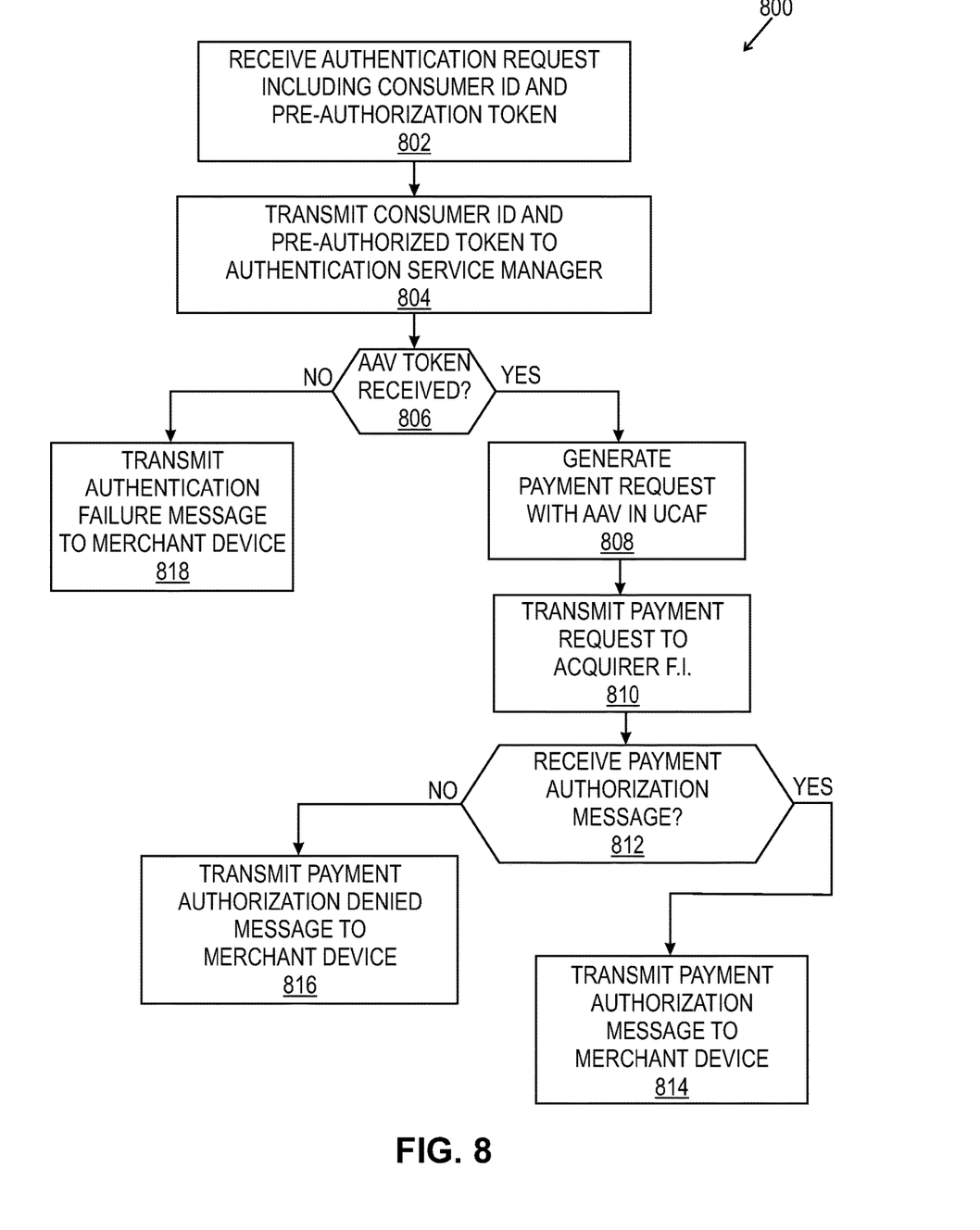
FIG. 8 is a flowchart illustrating a consumer authentication and payment authorization process that includes the use of a pre-authorized token from the point of view of the Proxy Service Manager Server computer of FIG. 2 according to an embodiment of the invention.

FIG. 8 is a flowchart illustrating a consumer authentication and payment authorization process 800 according to an embodiment that includes the use of a pre-authorized token from the point of view of the Proxy Service Manager Server computer 204 of FIG. 2. In particular, the Proxy Service Manager Server computer receives 802 an authentication request including a pre-authorized token from a merchant device. In some embodiments, the authentication request also includes a consumer identifier, which may be an alias or surrogate factor as described herein. In some implementations, the Proxy Service Manager Server computer then establishes a secure channel with an Authentication Service Manager Server computer and transmits 804 the consumer identifier and the pre-authorized token to the Authentication Service Manager Server computer.

Next, the Authentication Service Manager computer processes the information, and if the cardholder is authenticated, the Proxy Service Manager Server computer receives 806 a non-repudiable accountholder authentication value ("AAV") token. If an AAV token is received 806, then the Proxy Service Manager Server computer generates 808 a payment authorization request with the AAV token in, for example, a Universal Card Authentication Field ("UCAF"). The Proxy Service Manager Server computer next transmits 810 the payment authorization request to an Acquirer FI Server computer. If all was in order (i.e., the cardholder account was verified by the Issuer financial institution) then the Proxy Service Manager Server computer receives 812 a payment authorization message and then transmits 814 the payment authorization message to the Merchant Device so that the merchant can complete the purchase transaction with the consumer. But if a payment authorization message was not received in step 812 (for example, the Proxy Service Manager receives a payment declined message), then the Proxy Service Manager transmits 816 a payment authorization denied message to the merchant. In this case, the merchant does not complete the purchase transaction with the consumer.

Referring again FIG. 8, if in step 806 an AAV token is not received from the Authentication Service Manager Server computer within a predefined time limit, or if an "authentication failed" message is received from the Authentication Service Manager Server computer, then the Proxy Service Manager Server computer transmits 818 a "cardholder authentication failure" message to the Merchant Device. In this case, the merchant doe not complete the purchase transaction with the consumer.

In some embodiments, instead of generating the payment authorization request in step 808 of the process 800, the Proxy Service Manager Server computer 204 transmits the AAV token generated by the Authentication Service Manager Server computer 206 directly to the Merchant Device 202 (see FIG. 2). In this case, the Merchant Device is operable to create a payment authorization request message with the AAV token in the UCAF, and to transmit the payment authorization request directly to the Acquirer FI Server computer. With reference to FIG. 2, processing then continues as described above, with the Acquirer FI Server computer 208 routing the payment authorization request through the payment network 210 to the Issuer FI Server computer 212, which validates the AAV token and generates a payment authorization message. The payment authorization message is routed back to the Acquirer FI Server computer 208 and to the Proxy Service Manager Server computer 204, and lastly to the Merchant Device 202, so that the merchant can complete the purchase transaction with the consumer.

In some embodiments, the remote payments assurance service may include a process wherein the Issuer FI permits the Authentication Service Manager Server computer to generate a unique "one-time" token or "real-time" token for a consumer during the authentication request. Such a process will now be explained with reference to the assurance service system 200 of FIG. 2, which supports merchant initiated remote payments. In this implementation, the cardholder utilizes her consumer mobile device 102 to provide cardholder payment account information to a merchant device 202. The merchant device 202 then initiates an authentication request and transmits the cardholder payment information to the Proxy Service Manager Server computer 204. In some embodiments, the Proxy Service Manager Server computer establishes a secure channel with the Authentication Service Manager Server computer 206, and then provides the cardholder payment account information to it. The Authentication Service Manager receives and authenticates the cardholder's payment information and looks up the MSISDN (the mobile telephone number of a SIM card of the consumer's cell phone) that is registered to the consumer or cardholder. In some embodiments, the Authentication Service Manager Server computer 206 then generates a unique real-time token with a purchase identifier and transmits it to the cardholders' mobile device utilizing any of a variety of communications channels, for example, SMS, e-mail, etc.

In this implementation, the cardholder receives the unique token or real-time token and the purchase identifier at her mobile device, and then provides them both to the merchant device 202. (Since the consumer receives the token and purchase identifier at the time of entering into a purchase transaction, the process may be thought of as occurring in "real time".) The merchant device in turn submits the real-time token with a purchase identifier of the cardholder to the Proxy Service Manager Server computer 204. At this point, the Proxy Service Manager Server computer again establishes a secure channel with the Authentication Service Manager Server computer then transmits the real-time token and the purchase identifier to it. The Authentication Service Manager Server computer 206 validates the real-time token and the purchase identifier, and then generates a dynamic and unique (and non-repudiable) accountholder authentication value ("AAV") token. The Authentication Service Manager Server computer 206 next provides the AAV token to the Proxy Service Manager Server computer 204, which creates a payment authorization request with the AAV token in, for example, a Universal Card Authentication Field ("UCAF"), and then transmits the authorization request to the Acquirer FI Server computer 208. The Acquirer FI Server computer 208 sends the authorization request to the payment network 210 which routes it to the Issuer FI Server computer 212. The Issuer FI computer validates the AAV supplied in the UCAF, and if all is in order, transmits a payment authorized message to the payment network 210, which routes it to the Acquirer FI server computer 208. The Acquirer FI server computer 208 then transmits the payment authorized message to the Proxy Service Manager Server computer which sends it to the Merchant Device 202 so that the merchant can complete the purchase transaction with the consumer. In some embodiments, a settlement process may occur at a later time wherein the necessary funds to cover the payment transaction are transferred from the cardholder's financial account held by the Issuer FI to the merchant's financial account held by the Acquirer FI.

In some embodiments, after the cardholder is authenticated, the Proxy Service Manager Server computer 204 returns the AAV generated by the Authentication Service Manager Server computer 206 to the Merchant Device 202. In this case, the Merchant Device 202 is operable to create a payment authorization request message with the AAV token in the UCAF, and to transmit the payment authorization request directly to the Acquirer FI Server computer 208. Processing then continues as described above, with the Acquirer FI Server computer 208 routing the payment authorization request through the payment network 210 to the Issuer FI Server computer 212, which validates the AAV and generates a payment authorization message. The payment authorization message is routed back to the Acquirer FI Server computer 208 and to the Proxy Service Manager Server computer 204, and lastly to the Merchant Device 202, so that the merchant can complete the purchase transaction with the consumer.

In an alternative embodiment, instead of the Proxy Service Manager Server computer 204 generating the payment authorization request during the process, the Proxy Service Manager Server computer instead transmits the AAV token generated by the Authentication Service Manager Server computer 206 to the Merchant Device 202. In this case, the Merchant Device is operable to create a payment authorization request message with the AAV token in the UCAF, and to transmit the payment authorization request directly to the Acquirer FI Server computer 208. With reference to FIG. 2, processing then continues as described above, with the Acquirer FI Server computer 208 routing the payment authorization request through the payment network 210 to the Issuer FI Server computer 212, which validates the AAV and generates a payment authorized message (if all is in order). The payment authorized message is then routed back to the Acquirer FI Server computer 208 through the payment network 210, and next to the Proxy Service Manager Server computer 204 which transmits it to the Merchant Device 202. Once the payment authorized message is received at the Merchant Device, the merchant can complete the purchase transaction with the consumer.

The real-time token process described immediately above may be acceptable to regulators in certain countries or jurisdictions as a legitimate and secure process for remote payments. It may be acceptable to the regulators because of several characteristics. First, the payment card account number proves knowledge of payment information; second, the MSISDN (of the cardholder's mobile device, which was pre-registered by the cardholder) used to for sending the real-time token is proof of an item that the cardholder owns (the mobile device); and third, the real-time token that is generated is not based on any of the information visible on a payment card or on a visible surface of the cardholder's mobile device.

Due to regulatory requirements in some jurisdictions, such as those mandated in India, there is a need for remote payments assurance services that allow cardholder authentication for a card-not-present purchase transaction to be performed by a cardholder and verified by the Issuer FI. The systems and processes described herein provide remote payments assurance services that satisfy that need. In particular, the described systems provide the components needed for Issuer FI's and Acquirer FIs (and their end customers, who are the cardholders and merchants) to satisfy such requirements in a secure and efficient manner, and without the need for significant system changes.

In some markets, Issuer FI's are reluctant to accept debit account transactions (for example, by using a system such as the Maestro™ CNP system) because of the inability to authenticate a cardholder (except for an electronic-commerce transaction wherein a process such as that promulgated by SecureCode™ is used). The systems and methods described herein provide Issuer FIs in those markets with a solution for the additional authentication to be performed, and furthermore provide for other remote payment channels such as IVR/Phone, Mail Order and potentially recurring payment transactions.

Merchants and Acquirer FI's also benefit from the described systems and methods due to the shift in liability that occurs. In particular, for properly identified purchase transactions under the processes described herein, the Issuer FI loses fraud related chargeback rights because the Issuer FI, through use of an Authentication Service Manager, not only authenticated the cardholder but also approved the payment request during the process.

Lastly, cardholders benefit from the described systems and processes because of the additional security inherent in a process wherein the cardholder self-authenticates. That is, in each of the described processes, the cardholder pre-registers with an Authentication Service Manager before entering into any purchase transactions. When initiating a purchase transaction, the cardholder provides information to authenticate him or herself to the Authentication Service Manager Server computer for a particular purchase transaction before a payment is made.

It should be understood that the above description and/or the accompanying drawings are not meant to imply a fixed order or sequence of steps for any process referred to herein. Rather, any process described herein may be performed in any order that is practicable, including but not limited to simultaneous performance of steps indicated as sequential. In addition, in some instances steps that are depicted or described herein as being sequential may be performed in parallel in some embodiments.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A merchant-initiated consumer authentication and payment authorization method, comprising:
   receiving, by a Proxy Service Manager Server computer, a consumer authentication request from a merchant device comprising a proximity payment device, wherein the consumer authentication request includes consumer information obtained when a consumer uses a consumer mobile device to transmit payment transaction data to the proximity payment device to conduct a card not present (CNP) transaction;
   establishing, by the Proxy Service Manager Server computer, a secure communications channel between the Proxy Service Manager Server computer and an Authentication Service Manager Server computer;
   transmitting, by the Proxy Service Manager Server computer via the secure communications channel, the consumer authentication request comprising the consumer information to the Authentication Service Manager Server computer associated with the consumer;
   receiving, by the Proxy Service Manager Server computer from the Authentication Service Manager Server computer, a non-repudiable, one-time accountholder authentication value ("AAV") token generated by the Authentication Service Manager Server computer by using a Mobile Subscriber Integrated Services Digital Network (MSISDN) number of the consumer mobile device for the CNP transaction;
   generating, by the Proxy Service Manager Server computer, a payment authorization request that includes the AAV token in a Universal Card Authentication Field;
   transmitting, by the Proxy Service Manager Server computer, the payment authorization request to an Acquirer financial institution (FI) Server computer;
   receiving, by the Proxy Service Manager Server computer from the Acquirer FI, a payment authorization message signifying that the Issuer FI validated the AAV token; and transmitting, by the Proxy Service Manager Server computer, the payment authorization message to the merchant device to complete the CNP purchase transaction.

2. The method of claim 1, wherein the consumer authentication request comprises an alias or a surrogate factor.

3. The method of claim 2, further comprising, subsequent to transmitting the consumer authentication request:
mapping, by the Authentication Service Manager Server computer, the alias or the surrogate factor to consumer account information;
validating the consumer account information;
generating a non-repudiable AAV token; and
transmitting, by the Authentication Service Manager Server computer, the non-repudiable AAV token to the Proxy Service Manager Server computer.

4. The method of claim 3, wherein validating the consumer's account information further comprises:
retrieving a MS-ISDN number from a database storing consumer mobile device data;
transmitting, by the Authentication Service Manager Server computer, a challenge/response request to the MS-ISDN number;
receiving an authentication response with cardholder credentials from the cardholder's mobile device; and
validating the cardholder credentials.

5. The method of claim 1, further comprising, subsequent to transmitting the payment authorization request to an Acquirer FI Server computer:
receiving, by the Proxy Service Manager Server computer, a payment authorization denied message; and
transmitting the payment authorization denied message to a merchant device.

6. The method of claim 1, further comprising, prior to receiving the AAV token:
receiving, by the Proxy Service Manager Server computer, an authentication failed message from the Authentication Service Manager Server computer; and
transmitting a cardholder authentication failure message to a merchant device.

7. The method of claim 1, wherein the consumer authentication request comprises one of an account identifier of a consumer and a pre-authorized token.

8. The method of claim 1, wherein receiving the consumer authentication request further comprises receiving merchant identification information.

9. The method of claim 8, wherein transmitting the payment authorization request to an Acquirer FI Server computer further comprises transmitting the merchant identification information.

10. The method of claim 9, further comprising receiving a payment authorization denied message based on the merchant identification information.

11. A consumer authentication and payment authorization method, comprising:
receiving, by a Proxy Service Manager Server computer from a merchant device comprising a proximity payment device, a consumer authentication request comprising a consumer identifier and a pre-authorization token-having an expiration date, wherein the consumer authentication request is obtained when a consumer uses a consumer mobile device to transmit payment transaction data to the proximity payment device to conduct a card not present (CNP) transaction;
determining, by the Proxy Service Manager Server computer, that the expiration date of the pre-authorization token is valid;
establishing, by the Proxy Service Manager Server computer, a secure communications channel between the Proxy Service Manager Server computer and an Authentication Service Manager Server computer;
transmitting, by the Proxy Service Manager Server computer via the secure communications channel, the consumer authentication request to the Authentication Service Manager Server computer associated with the consumer;
receiving, by the Proxy Service Manager Server computer from the Authentication Service Manager Server computer, a non-repudiable, one-time accountholder authentication value ("AAV") token generated by the Authentication Service Manager Server computer by using a Mobile Subscriber Integrated Services Digital Network (MSISDN) number of the consumer mobile device for the CNP transaction;
generating, by the Proxy Service Manager Server computer, a payment authorization request that includes the AAV token in a Universal Card Authentication Field;
transmitting, by the Proxy Service Manager Server computer, the payment authorization request to an Acquirer financial institution (FI) Server computer;
receiving, by the Proxy Service Manager Server computer, a payment authorization message signifying that the Issuer FI validated the AAV token; and
transmitting, by the Proxy Service Manager Server computer, the payment authorization message to the merchant device to complete the CNP purchase transaction.

12. The method of claim 11, wherein the consumer authentication request comprises an alias or a surrogate factor.

13. The method of claim 11, further comprising, prior to receiving the AAV token:
receiving, by the Proxy Service Manager Server computer, an authentication failure message; and
transmitting the authentication failure message to a merchant device.

14. The method of claim 11, further comprising, subsequent to transmitting the payment authorization request to an Acquirer FI Server computer:
receiving a payment authorization denied message; and
transmitting the payment authorization denied message to a merchant device.

15. The method of claim 11, wherein receiving the consumer authentication request further comprises receiving merchant identification information.

16. The method of claim 15, wherein transmitting the payment authorization request to an Acquirer FI Server computer further comprises transmitting the merchant identification information.

17. The method of claim 16, further comprising receiving a payment authorization denied message based on the merchant identification information.

* * * * *